United States Patent [19]

Hiltunen et al.

[11] Patent Number: 4,940,007
[45] Date of Patent: Jul. 10, 1990

[54] FAST FLUIDIZED BED REACTOR

[75] Inventors: Matti Hiltunen, Karhula, Finland; Ragnar Lundqvist, Norwood, Colo.; Juha Sarkki, Karuna, Finland

[73] Assignee: A. Ahlstrom Corporation, Noormarkku, Finland

[21] Appl. No.: 232,778

[22] Filed: Aug. 16, 1988

[51] Int. Cl.⁵ .................. F27B 15/02; B01J 8/18; B01J 15/06
[52] U.S. Cl. .................. 110/347; 110/216; 110/245; 422/139; 422/143
[58] Field of Search .............. 110/245, 347, 216; 422/139, 143, 147; 34/57 A; 122/4 D; 431/170

[56] References Cited

U.S. PATENT DOCUMENTS

| 3,374,168 | 3/1968 | Metrailer | 422/139 X |
| 3,883,344 | 5/1975 | Griffith et al. | 422/143 X |
| 4,213,938 | 7/1980 | Pyzel | 422/143 |
| 4,259,925 | 4/1981 | Barnert et al. | 422/143 X |
| 4,311,670 | 1/1982 | Nieminen et al. | 422/147 X |
| 4,407,355 | 10/1983 | Bonn et al. | 422/143 X |
| 4,419,330 | 12/1983 | Ishihara et al. | 422/143 |
| 4,518,750 | 5/1985 | Govoni et al. | 422/143 X |
| 4,545,959 | 10/1985 | Schilling et al. | 422/143 X |
| 4,615,870 | 11/1986 | Armstrong et al. | 422/147 X |
| 4,664,887 | 5/1987 | Engström | 422/147 |
| 4,687,497 | 8/1987 | Owen et al. | 422/147 X |
| 4,725,409 | 2/1988 | Wolf | 422/147 X |
| 4,747,852 | 5/1988 | Engström | 422/147 X |
| 4,755,358 | 7/1988 | Voll et al. | 422/147 X |

Primary Examiner—Michael S. Marcus
Assistant Examiner—Amelia L. Santiago
Attorney, Agent, or Firm—Nixon & Vanderhye

[57] ABSTRACT

In a fast fluidized bed reactor having, in a lower region, downwardly and inwardly inclined walls, a change in the direction of the wall surface or a ledge or protrusion is provided to change the direction of the particles flowing downwardly adjacent the wall for directing the particles inwardly away from the wall and into the region acted on by the nozzles providing the fluidizing gas. The change of direction, abutment or projection is preferably provided along the refractory wall surface at an elevation 200–1100 mm above the grid plate. In this manner, clogging of the nozzles is prevented and more efficient and effective fluidization and combustion processes occur.

25 Claims, 4 Drawing Sheets

FAST FLUIDIZED BED REACTOR

BACKGROUND OF THE INVENTION

This invention relates to the geometry of peripheral walls in the lower regions of combustion chambers in fast fluidized bed reactors. The walls are generally downwardly and inwardly inclined and typically have a relatively dense film of particles flowing downwardly close to their surfaces. This heavy particle flow causes problems when it reaches the grid plate at the bottom of the combustion chamber because the fluidizing gas from the nozzles or holes in the grid is not entirely capable of satisfactorily fluidizing the particles. A pulsation of particles and gas is created close to the grid plate which leads to grid leakage mainly through the first three peripheral rows of grid nozzles.

Fast fluidized bed reactors are typically used in a variety of different processes such as combustion, gasification and heat transfer processes. Fast fluidized bed reactors are also used in heat generation, as well as in chemical and metallurgical processes. Depending upon the particular processes, particulate fuel such as coal, lignite, wood waste and peat as well as other particulate matter such as sand, limestone, ash, catalysts and metaloxides are fluidized in the reactor. In fast fluidized bed reactors very fine 10–300 $\mu$m particulate material can also be used.

The fast fluidized bed reactor utilized in combustion processes comprises an upright combustion chamber, having substantially vertical peripheral walls. The walls in the lower region of the combustion chamber are usually inwardly inclined (slanting) and made as refractory walls to withstand the heat in the bottom region of the combustion chamber. The upper walls in the reactor are made as tube walls. The combustion chamber has one or more inlets for the particulate material which is to be combusted. Inlets for other particulate material such as limestone for sulphur capture are also provided in the reactor. Inlets for secondary air can be disposed at different levels in the peripheral walls. Primary air is normally supplied to the combustion chamber through a windbox or air chamber beneath the combustion chamber. The air is supplied through nozzles or holes in a grid plate which is disposed between the combustion chamber and the windbox. In a fast fluidized bed, air is supplied through the nozzles at a velocity high enough to fluidize the particles in the combustion chamber to a stage where a substantial portion of the particles are transported out of the combustion chamber with the exhaust gases. The velocity of the gas flow in the bed is about 2–10 m/s. A bed can be maintained in the combustion chamber only by recirculation of particles entrained with the gases and separated from the off gas by a high efficiency separator. The solids concentration in the combustion chamber decreases continuously up the chamber and does not show a definite border between a dense bed and a freeboard region.

Notwithstanding the high gas velocity the solids velocity in the combustion chamber is relatively low. The fast bed condition is marked by relatively high solid concentrations and aggregations of particles in clusters and strands. The fine particles flowing upward in the combustion chamber form clusters of particles which are heavy and fall downwards against the gas stream. The clusters break apart and reform in rapid succession. The particle behavior in the reactor leads to a uniform temperature throughout the reactor. Due to more efficient contact between gas and solids, high heat transfer rates are achieved as well as high reaction rates for other reactions in the combustor. Nearly complete carbon combustion is achieved as well as higher efficiency in limestone utilization in sulphur capture.

At specific locations in the combustion chamber, there are both downwards and upwards mass flow. The absolute mass flow varies in radial and axial directions in the combustion chamber. The absolute upwards mass flow has its maximum on the combustion chamber center-line whereas the downwards mass flow is extreme near the peripheral wall. The density of particle suspension and, consequently, the mass flows increase towards the lower region of the combustion chamber. This leads to a heavy downward flowing film of particles near the peripheral wall at the bottom of the combustion chamber. The downwardly flowing dense film of particles can be 10–50 mm thick and have additional particle layers of decreasing density and decreasing downward velocity inwardly of the dense film. The dense film causes pulsations at the grid area, plugging of nozzles and backflow of particles into the windbox. The backflow is localized to the border area between the peripheral wall and grid plate, this being observed by sparks emitted from the fine carbonaceous particles entering the windbox.

As the fluidized bed reactors are scaled up, the dense particle film flowing down the inclined walls grows and the problems related to this grow as well. It is essential for the combustion process and other reactions taking part in the combustor that particle and gas jets introduced into the lower regions reach as deep into the reactor chamber as possible. The dense bed in the lower region prevents particles and gases from reaching very far into the bed. In order to overcome this problem, the cross-sectional area of the combustion chamber in the lower dense regions is dimensioned to allow particle or gas jets from the side walls to reach almost into the middle of the combustion chamber. As the cross-sectional area has to increase in an upward direction as the gas flow increases due to combustion, the side walls must be upwardly and outwardly inclined. If the grid area is about 50% of the upper cross-sectional area, the projection of the side walls in the lower region is also 50% of the upper cross-sectional area. The projection of the side walls corresponds to the peripheral area of the upper cross-sectional area. Consequently the side walls will receive substantially all particles flowing downwardly in the peripheral area of the combustion chamber.

The downwardly flowing particle film interferes with the fluidization and mixing of particles in the combustion chamber. Optimal process conditions demand a steady and equal supply of fluidizing and combustion air. Pulsations in the gas flow have detrimental effects on combustion efficiency as well as on other reactions taking place in the combustor.

Backflow of particles through the nozzles is especially a problem in the fast fluidized bed reactors due to the very fine material being fluidized. The fine particles can easily enough flow into the openings in the nozzles and interfere with the air supply through the nozzles as well as plug them totally. The backflow of material into the windbox leads to losses in fine carbonaceous material.

The particles can also cause the nozzles to wear out prematurely if the fine particles flow back and forth in the nozzle openings as a result of the pulsation in the reactor.

It has been suggested that backflow can be avoided by keeping the pressure difference over the grid plate sufficiently high or by increasing the flow of fluidizing air. But the backflow tendency in the nozzles near the peripheral wall is not easily avoided. In some reactors, the velocity in the openings in the nozzles has to be increased to relatively high levels, 60 m/s, to avoid backflow. This increases the power demand for air blowers. It is, of course, possible to increase the velocity in only the nozzles concerned, but that requires a rather complicated arrangement to supply nozzles with air from different air supply devices. It has also been suggested to use special nozzles designed to prevent backflow but does not solve the problem with the heavy particle film flowing downwards to the grid area.

While the problem of backflowing particles in fluidized beds is well known, and many solutions have been proposed, such solutions have not been entirely successful. It is believed that the cause of backflow and pulsation at the peripheral grid area has not been well understood. Therefore, it is believed that an optimum design of the lower region of the reactor, which provides an even distribution of fluidizing gas into the reactor, good mixing of bed material and optimal conditions for reactions taking place in the reactor, has not yet been provided.

It is therefore an object of the present invention to provide a design for the lower peripheral walls in the combustion chamber of a fluidized bed which minimizes or eliminates the above-mentioned problems with backflow, plugging of nozzles and pulsations.

It is another object of this invention to provide a design for the lower peripheral walls in the combustion chamber of a fluidized bed which interferes with the downwardly flowing relatively dense film of particles adjacent the wall.

It is a further object of the present invention to provide a design for the lower peripheral walls in the combustion chamber of a fluidized bed which promotes the fluidization of the particles flowing downwardly as a film along the combustion chamber wall.

According to a broad aspect of the present invention, a fast fluidized bed reactor is provided which comprises means for changing, at a height 200–1100 mm above the grid plate, the direction of particles, flowing downwardly close to the inclined or slanting wall in the lower region of the combustion chamber. The means for changing the direction of the particles is disposed at a height <1100 mm from the grid plate. Such changing means direct the particles for flow in a direction away from the wall.

The lower usually inclined walls in the combustion chamber are preferably made of refractory and preferably reach an elevation 2–4 m above the grid plate. The means which interfere with the particle flow along the inclined wall are disposed at a relatively low elevation along the refractory wall. If the means for breaking the particle film was disposed at a higher elevation, a new particle flow could build up at the wall.

In most reactors, two opposite walls, the front and back wall, are inclined at the bottom region. The cross-section of a reactor chamber is mostly rectangular, the front and back walls forming the long walls and the side walls being shorter. The front and back walls form an angle about 100–120° with the horizontal, the side walls perhaps only 90–100° with the horizontal. In some embodiments, only one wall can be inclined. In reactors having a circular cross-section, the walls in the lower region have a conical shape. The means interfering with the downward flowing particle film extend preferably continuously across the entire horizontal width of the slanting walls but could be made non-continuous if desired.

The inlets for particulate material such as fresh fuel, limestone and recycled particles as well as secondary air are preferably added at an elevation above the particle flow interfering means.

A step in the inclined wall can effectively direct the particle film away from the wall. The step may be 200–1100 mm above the grid plate. The step changes the direction of the downwardly flowing particles so as to direct them inwardly in a direction to cross the fluidizing gas jets from the nozzles or holes in the grid plate. The gas will then fluidize at least a part of the particles which will be entrained by the gas flow. The step used to interfere with the particle film is preferably 300–1000 mm above the grid plate, most preferably at an elevation 300–700 mm above the grid plate. The height of the step can easily be adjusted to suit the mass flow in the reactor. The step has preferably a depth of 50–300 mm or more preferably 100–150 mm. Moreover, it is relatively easy to reconstruct the refractory in the lower combustion chamber to form a step according to the invention.

The particle film along the inclined wall can also be disturbed and disrupted by a ledge disposed at a height of about 200–1100 mm above the grid plate. The ledge can be designed to give the particle film flow a preferred direction. The ledge can easily be fastened in the refractory wall at a suitable elevation.

The particle film can also be disturbed by just changing the inclination of the wall to form an angle <100° with the horizontal. In a preferred embodiment, the lowermost part of the refractory walls are made substantially vertical. The wall can even be arranged to form an angle <90° at a height 200–1100 mm above the grid plate.

The present invention relates also to a method of operating a fast fluidizing bed reactor by changing the direction of particles flowing downwards along lower parts of peripheral walls in the combustion chamber, changing the direction of the particles at a height 200–1100 mm above the grid plate and causing the particles to flow in a direction to come into the range of gas jets supplied through the distributors in the grid plate.

It is the primary object of the present invention to provide for even distribution of fluidizing gas and to improve the combustion and heat transfer processes in the reactor while preventing backflow of solids into the gas nozzles and decreasing the dense particle flow along inclined walls in the lower region of the combustion chamber.

Other reactions taking place between solid particles and gas are also improved due to more even fluidization of particles. The elimination of the plugging tendency of nozzles is, of course, an improvement as well.

In a preferred embodiment of the present invention, there is provided a fast fluidized bed reactor comprising an upright combustion chamber having an upper region with generally vertical peripheral walls and a lower region with at least one generally downwardly and inwardly inclined peripheral wall for flow of a relatively dense layer of particles downwardly close to its surface, an inlet in the combustion chamber for particulate material to be reacted and an outlet disposed in the upper region of the combustion chamber for exhausting gas. A windbox is located beneath the combustion chamber for providing fluidizing gas to the combustion chamber, with a grid plate positioned between the windbox and the combustion chamber, the grid plate having openings for supplying gas from the windbox to the combustion chamber at a sufficient velocity to fluidize particulate material in the combustion chamber and to transport a portion of the particulate material out of the combustion chamber with the discharged exhaust gas. A particle separator is connected to the exhaust gas outlet for separating entrained particles from the exhaust gas, the separator having an outlet for clean gas and an outlet for particles connected to the lower part of the combustion chamber for recycling the separated particles into the combustion chamber. Means are provided inwardly of the inclined wall and above the grid plate for changing the direction of the particles flowing downwards close to the inclined wall for preventing clogging and backflow of particles through the openings into the windbox, the changing means being disposed adjacent the inclined wall for directing the particles to flow in a direction away from the wall.

In another aspect of the present invention, there is provided a method of operating a fast fluidizing bed reactor for combusting particulate material comprising the steps of supplying fluidizing gas to a combustion chamber through distributors in a grid plate at a sufficient velocity to fluidize the particulate material and transport a substantial portion of the particulate material out from the combustion chamber with exhaust gases, separating particles from the exhaust gas and recycling the separated particles to the combustion chamber, changing the direction of particles flowing downwardly along lower parts of peripheral walls in the combustion chamber at a height 200-1000 mm above the grid plate and causing the particles to flow in a direction so that the particles become influenced by the gas flowing through the distributors in the grid plate.

In the description, a fast fluidized bed reactor with combustion chamber is used to illustrate the present invention but the invention is applicable to other processes in fast fluidized bed reactors as well.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
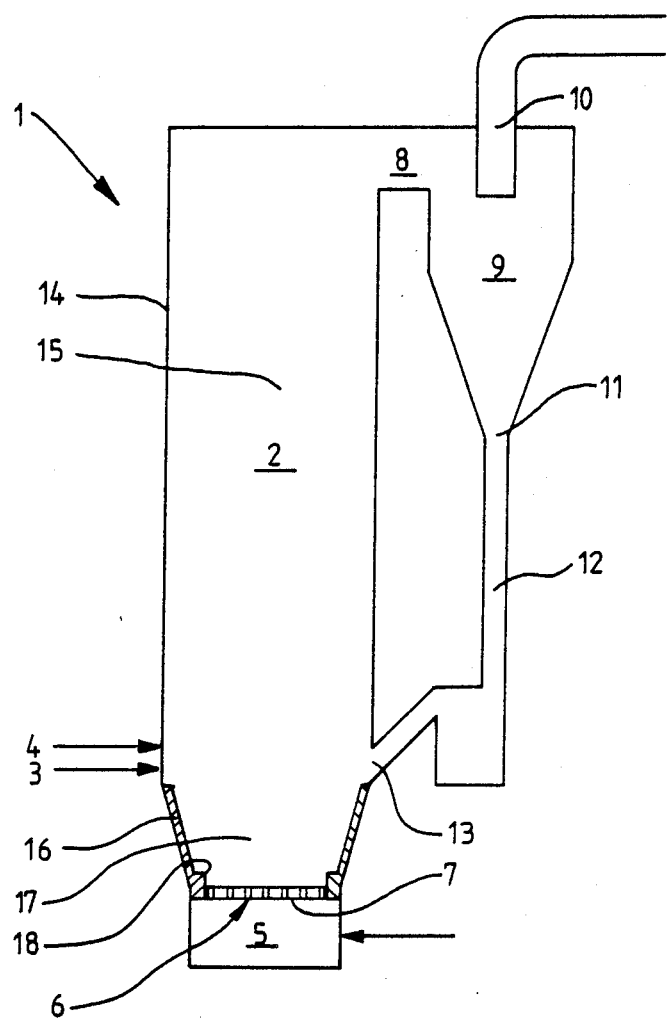
FIG. 1 is a schematic cross-sectional side view of a fast fluidized bed reactor according to one embodiment of this invention.

FIG. 1 shows a fast fluidized bed reactor for combusting particulate carbonaceous material in the combustion chamber 2 of the reactor. The fuel is introduced at an inlet 3 at the lower part of the combustion chamber. Limestone is introduced at another inlet 4 for capturing sulphur released from the fuel. The particulate material in the combustion chamber is fluidized and combusted by air being introduced from a windbox or air chamber 5 beneath the combustion chamber. The air is distributed through holes or nozzles 6 in a grid plate 7. If gas other than air is used to fluidize the particulate material, air has to be introduced for combustion through special air nozzles.

The fluidizing air has a velocity sufficient to achieve a transport of a substantial portion of the particulate material out of the combustion chamber with the exhaust gases. The exhaust gases discharge through an outlet 8 into a cyclone separator 9. The particles entrained with the gas from the combustion chamber is separated from the gas in the highly efficient cyclone 9. The cleaned gases leave the cyclone through outlet 10. The separated particles are recirculated to the combustion chamber through cyclone particle outlet 11, recycling channel 12 and opening 13 in the combustion chamber wall.

The walls 14 in the upper region 15 of the combustion chamber are vertical tube walls. The walls 16 in the lower region 17 are preferably made as inclined refractory walls.

Figure 2:
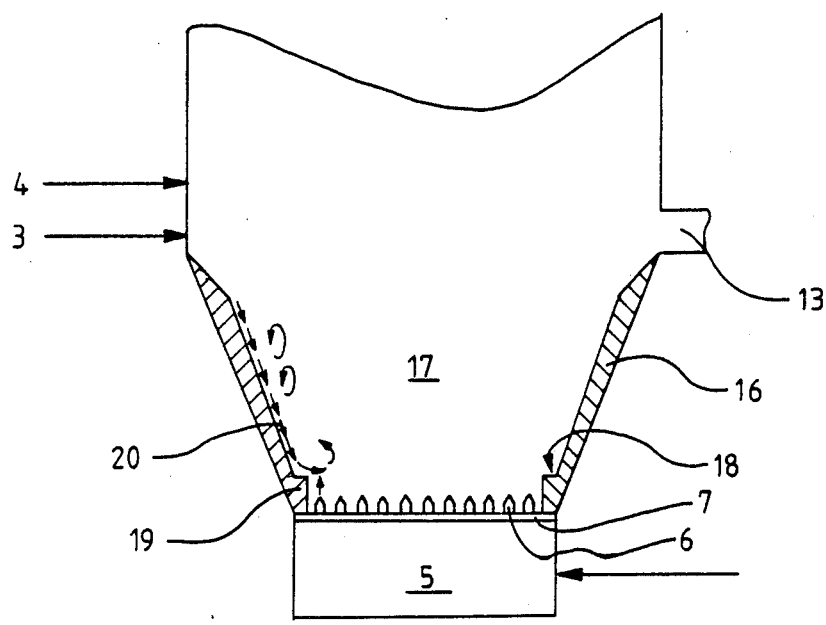
FIG. 2 is an enlarged schematic vertical cross-sectional view of the lower part of a combustion chamber illustrated in FIG. 1.

A step 18 is arranged in the inclined refractory wall, at the lowermost part 19 of the refractory wall. As can be seen in FIG. 2, the direction of the downwardly flowing particle layer 20 is changed by the step 18 in the lowermost part of the refractory wall. The particles are directed towards the center of the combustion chamber and are fluidized by air introduced through the nozzle closest to the refractory wall.

Figure 3:
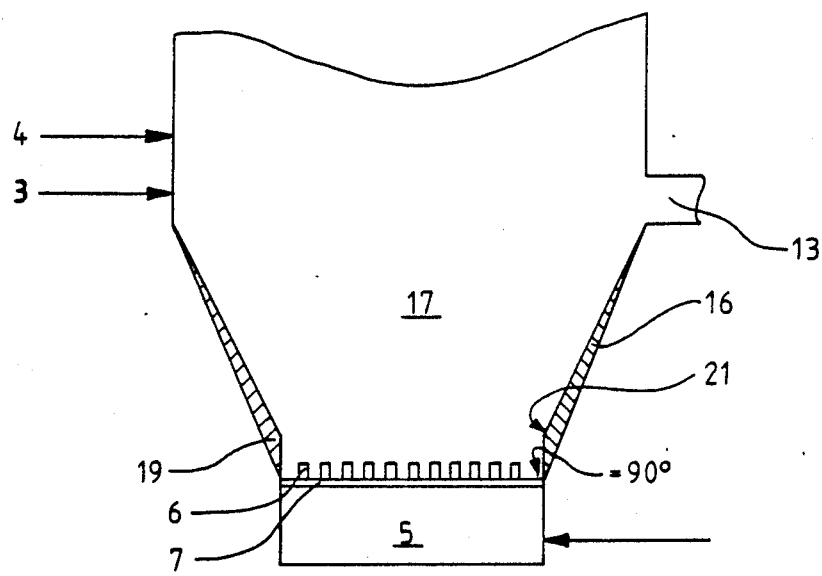
FIGS. 3 through 6 are enlarged schematic vertical cross-sectional views of the lower part of a combustion chamber according to other embodiments of this invention.
Figure 4:
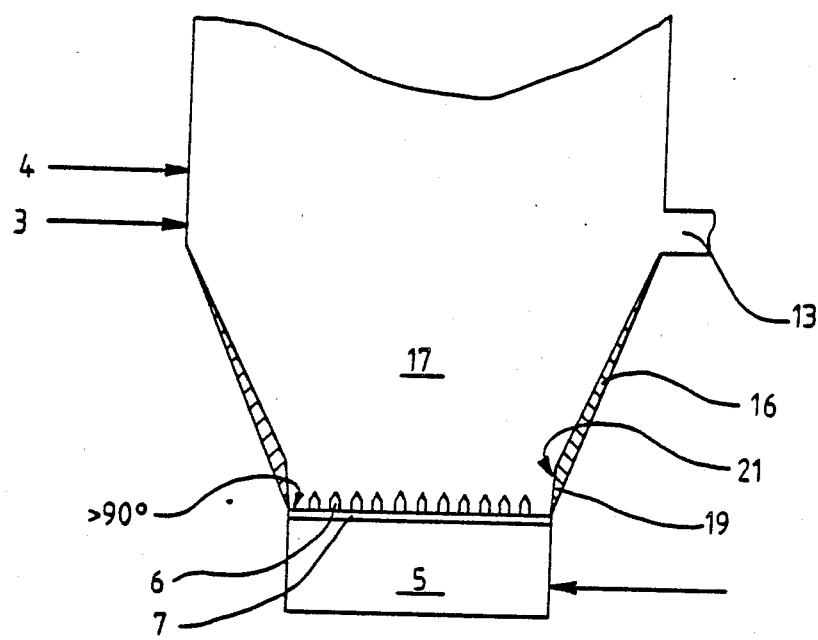
Figure 5:
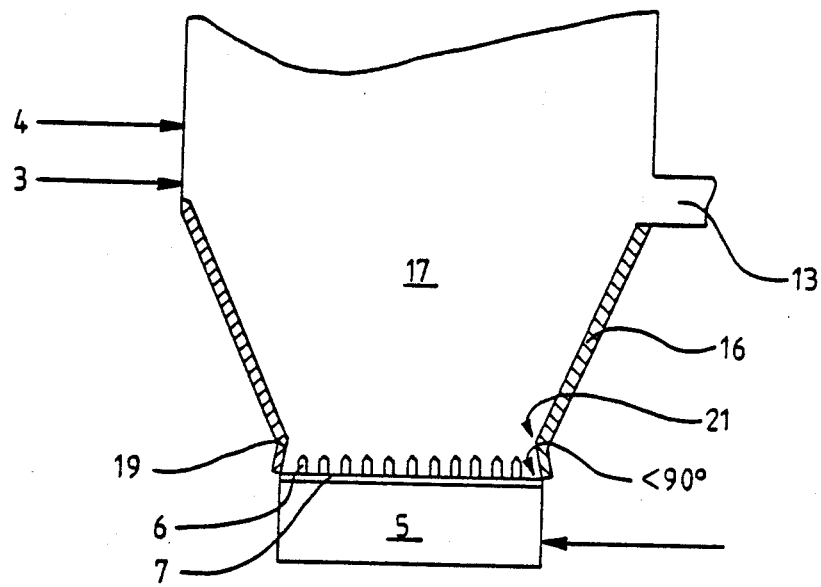

FIG. 3 shows another embodiment of the present invention. The refractory wall 16 is reconstructed at the lowermost part 19. The lowermost part 19 of the wall is substantially vertical from a point 21 disposed about 200-1100 mm from the grid plate. FIG. 4 shows still another embodiment of the present invention. The lowermost part 19 of the refractory wall is inclined >90° from horizontal but less than the inclination of the main part of the refractory wall. FIG. 5 shows still another embodiment of the present invention, where the lowermost part 19 is inclined to form an angle <90° from the horizontal. It will be appreciated from a review of FIGS. 3-5, that the means for changing the direction of the downwardly flowing particle layer along the inclined surface includes a lower wall surface 19 adjoining and forming a continuation of the inwardly inclined peripheral wall. The lower wall surface 19 forms an internal angle with the inclined peripheral wall within the chamber greater than 180° as measured internally, the lower wall surface being located above the grid plate in the lower region of the combustion chamber at a height less than 1100 mm above the grid plate.

Figure 6:
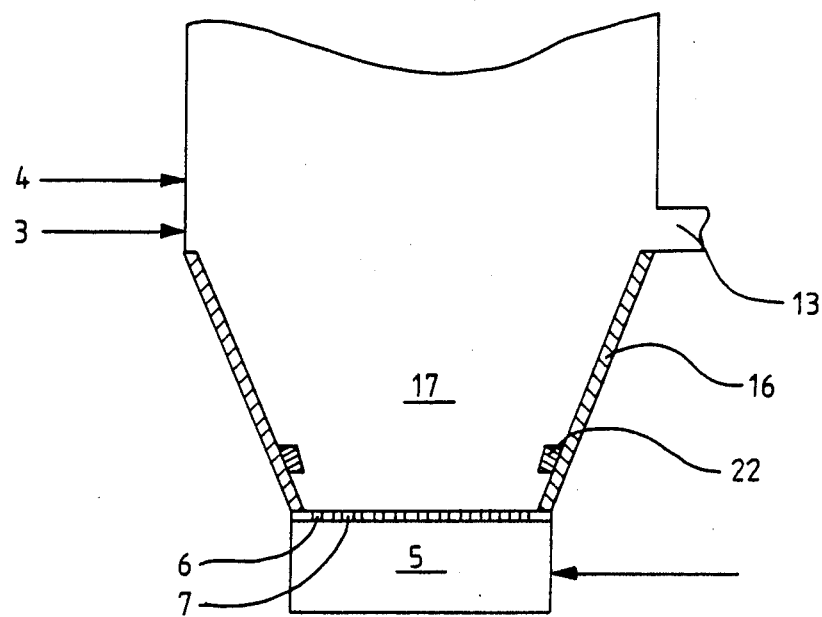

FIG. 6 shows one embodiment of the present invention where a ledge 22 is disposed in the refractory wall 16 at a point 200-1100 mm above the grid plate 7. The ledge 22 will change the direction of downflowing particles and prevent fine particles from clogging the holes 6 in the grid plate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fast fluidized bed reactor comprising:
   an upright combustion chamber having an upper region with generally vertical peripheral walls and a lower region with walls including at least one generally downwardly and inwardly inclined peripheral wall for flow of a relatively dense layer of particles downwardly close to its surface;
   an inlet in said combustion chamber for particulate material to be reacted;
   an outlet disposed in the upper region of said combustion chamber for exhausting gas;
   windbox means beneath said combustion chamber for maintaining fluidizing gas in said combustion chamber at a gas flow velocity in the bed of about 2-10 m/s;
   a grid plate between said windbox means and said combustion chamber, said grid plate having openings for supplying gas from said windbox means to said combustion chamber to maintain said gas flow velocity in said bed, fluidize particulate material in the combustion chamber and provide an upward flow of gas and particles thereby transporting a portion of the particulate material out of the combustion chamber with the discharged exhaust gas;
   a particle separator connected to said exhaust gas outlet for separating entrained particles from the exhaust gas, said separator having an outlet for clean gas and an outlet for particles connected to the lower region of the combustion chamber for recycling separated particles into the combustion chamber;
   means spaced above the grid plate and disposed in said lower region at a height less than 1100 mm above said grid plate for changing the direction of flow of the particles flowing downwards close to the inclined wall and redirecting such particles for flow in a direction inwardly, to cross the upward flow of gas and particles, thereby preventing clogging and backflow of particles through the openings into the windbox means; and
   said direction changing means adjoining the inclined wall and directing the particles to flow in a direction away from the wall.

2. A fast fluidized bed reactor according to claim 1 wherein said direction changing means is located at a height of 200-1100 mm above said grid plate.

3. A fluidized bed reactor according to claim 1 wherein said combustion chamber includes a second generally downwardly and inwardly inclined wall in the lower region thereof and disposed laterally opposite the said at least one generally downwardly and inwardly inclined peripheral wall.

4. A fluidized bed reactor according to claim 1 wherein the walls about the entire periphery of the lower region of the combustion chamber are generally downwardly and inwardly inclined 5. A fluidized bed reactor according to claim 1 wherein the lower region has conical-shaped walls.

6. A fluidized bed reactor according to claim 1 wherein the walls in the lower region of the combustion chamber are refractory walls.

7. A fluidized bed reactor according to claim 1 wherein said grid plate is horizontally disposed in said chamber, and the inclined peripheral wall forms an internal angle with the horizontal grid plate that ranges from 100° to less than 120°.

8. A fluidized bed reactor according to claim 1 wherein the means for changing the direction of the particles flowing downwardly is disposed at a height below the inlet for particulate material.

9. A fluidized bed reactor according to claim 1 including an inlet opening to said combustion chamber for flowing the separated particles into the combustion chamber, said direction changing means being disposed at a height below said inlet opening for flowing the separated particles into the combustion chamber.

10. A fluidizing bed reactor according to claim 1 wherein said changing means has a surface for directing particles into positions for entrainment by fluidizing gas.

11. A fluidizing bed reactor according to claim 1 wherein said grid plate is horizontally disposed in said chamber, and said direction changing means includes a wall surface forming a continuation of and a first angle with said inclined wall surface, and a second angle with the horizontal grid plate of >100°.

12. A fluidized bed reactor according to claim 11 wherein said second angle with the horizontal grid plate is substantially equal to 90°.

13. A fluidized bed reactor according to claim 12 wherein said wall surface is vertical, and lies below said inclined wall surface, the apex of said first angle being located at a height about 200-1100 mm above the grid plate.

14. A fluidized bed reactor according to claim 1 wherein said grid is horizontally disposed in said chamber, and has been inserted after wherein said direction changing means includes a wall surface forming a first angle with said inclined wall surface and forming a second angle with the horizontal grid plate of less than 90°.

15. A fluidized bed reactor according to claim 1 wherein a step is provided in the lowermost of the inclined wall at an elevation about 200-1100 mm above said grid plate.

16. A fluidized bed reactor according to claim 1 wherein a step is provided at the lowermost part of the inclined wall at an elevation about 300-1000 mm above said grid plate.

17. A fluidized bed reactor according to claim 1 wherein a step is provided at the lowermost part of the inclined wall at an elevation about 300-700 mm above said grid plate.

18. A fluidized bed reactor according to claim 15 wherein the step has a depth of 50-300 mm.

19. A fluidized bed reactor according to claim 15 wherein the step has a depth of 100-150 mm.

20. A fluidized bed reactor according to claim 1 including a ledge disposed in the inclined wall at a height about 200-1100 mm above the grid plate.

21. A fluidized bed reactor according to claim 1 wherein said direction changing means is disposed at an elevation above the grid plate openings supplying fluidizing air.

22. A fluidized bed reactor according to claim 1 wherein said direction changing means extends generally horizontally continuously along the inclined wall.

23. A method of operating a fast fluidizing bed reactor for combusting particulate material comprising the steps of:
supplying fluidizing gas to a combustion chamber through gas flow distributors in a grid plate at a velocity sufficient to achieve a gas velocity in the bed of about 2-10 m/s, to fluidize the particulate material and upwardly transport a substantial portion of the particulate material out from the combustion chamber with exhaust gases;
separating particles from the exhaust gas and recycling the separated particles to the combustion chamber; and
changing the direction of particles flowing downwardly along lower parts of peripheral walls in the combustion chamber at a height about 200-1100 mm above the grid plate by causing the particles to flow in a direction inwardly to cross the upward flow of gas and particles, when the particles contact an inwardly directed wall surface along the inclined wall above the grid plate at the lower region of the vessel, so that the downwardly flowing particles become influenced by the gas flowing through the gas flow distributors in the grid plate to prevent clogging of or backflow through the gas flow distributors.

24. A method of operating a fast fluidizing bed reactor for combusting particulate material wherein the reactor has an inclined lower peripheral wall part in the combustion chamber for flowing particles downwardly inwardly therealong and an adjoining lower wall surface forming a continuation of and an angle with the inclined lower peripheral wall part, the internal angle defined within the chamber between the lower wall surface and the inclined lower peripheral wall part being greater than 180° as measured internally, comprising the steps of:
supplying fluidizing gas to a combustion chamber through gas flow distributors in a grid plate at a velocity sufficient to achieve a gas velocity in the bed of about 2-10 m/s, to fluidize the particulate material and upwardly transport a substantial portion of the particulate material out from the combustion chamber with exhaust gases;
separating particles from the exhaust gas and recycling the separated particles to the combustion chamber; and
changing the direction of particles flowing in a first downwardly inclined direction along the lower peripheral wall part in the combustion chamber at a height about 200-1100 mm above the grid plate by causing the particles to flow, at a location adjacent the angle formed by the juncture of the lower peripheral wall part and the lower wall surface, in a direction inwardly to cross the upward flow of gas and particles, so that the downwardly flowing particles leave the inclined lower peripheral wall part and become influenced by the gas flowing through the gas flow distributors in the grid plate to prevent clogging of or backflow through the gas flow distributors.

25. A fast fluidized bed reactor comprising:
an upright combustion chamber having an upper region with generally vertical peripheral walls and a lower region with walls including at least one generally downwardly and inwardly inclined peripheral wall for flow of a relatively dense layer of particles downwardly close to its surface;
an inlet in said combustion chamber for particulate material to be reacted;
an outlet disposed in the upper region of said combustion chamber for exhausting gas;
windbox means beneath said combustion chamber for maintaining fluidizing gas in said combustion chamber at a gas flow velocity in the bed of about 2-10 m/s;
a grid plate between said windbox means and said combustion chamber, said grid plate having openings for supplying gas from said windbox means to said combustion chamber to maintain said gas flow velocity in said bed, fluidize particulate material in the combustion chamber and provide an upward flow of gas and particles thereby transporting a portion of the particulate material out of the combustion chamber with the discharged exhaust gas;
a particle separator connected to said exhaust gas outlet for separating entrained particles from the exhaust gas, said separator having an outlet for clean gas and an outlet for particles connected to the lower part of the combustion chamber for recycling separated particles into the combustion chamber; and
means for changing the direction of flow of the particles flowing downwards close to the inwardly inclined wall and redirecting such particles to flow in a direction away from the inwardly inclined wall, and inwardly to cross the upward flow of gas and particles, thereby preventing clogging and backflow of particles through the openings in the windbox means;
said direction changing means including a lower wall surface adjoining and forming a continuation of said inwardly inclined peripheral wall forming an internal angle therewith within said chamber greater than 180° as measured internally, and located above the grid plate in said lower region at a height less than 1100 mm above said grid plate.

* * * * *